United States Patent [19]

Shepard et al.

[11] 4,041,454

[45] * Aug. 9, 1977

[54] DATA HANDLING SYSTEM WITH REMOTE DOCUMENT SCANNER

[75] Inventors: David H. Shepard, Rye; Edward J. Gushue, Bedford Hills, both of N.Y.

[73] Assignee: Cognitronics Corporation, Stamford, Conn.

[*] Notice: The portion of the term of this patent subsequent to July 1, 1992, has been disclaimed.

[21] Appl. No.: 704,575

[22] Filed: July 12, 1976

Related U.S. Application Data

[63] Continuation of Ser. No. 569,051, April 17, 1975, abandoned, which is a continuation of Ser. No. 66,149, Aug. 21, 1970, Pat. No. 3,893,079, which is a continuation of Ser. No. 624,445, March 20, 1967, abandoned.

[51] Int. Cl.² .................................. G06K 9/12
[52] U.S. Cl. ................. 340/146.3 F; 340/146.3 H; 358/285
[58] Field of Search ............... 340/146.3 H, 146.3 F, 340/146.3 R; 178/7.6; 358/285, 206, 208

[56] References Cited

U.S. PATENT DOCUMENTS 3,893,079  7/1975  Shepard et al. .................. 178/7.6

Primary Examiner—Leo H. Boudreau
Attorney, Agent, or Firm—Parmelee, Johnson & Bollinger

[57] ABSTRACT

A central time-shared data processing system organized for character analysis and coupled to a number of remote document scanning stations each including a drum document feed, the drum being rotatable in small incremental steps, and means operable between steps for scanning the document along a path parallel to a line of characters on the document to produce data identifying graphic figures for analysis by the central processing system.

3 Claims, 6 Drawing Figures

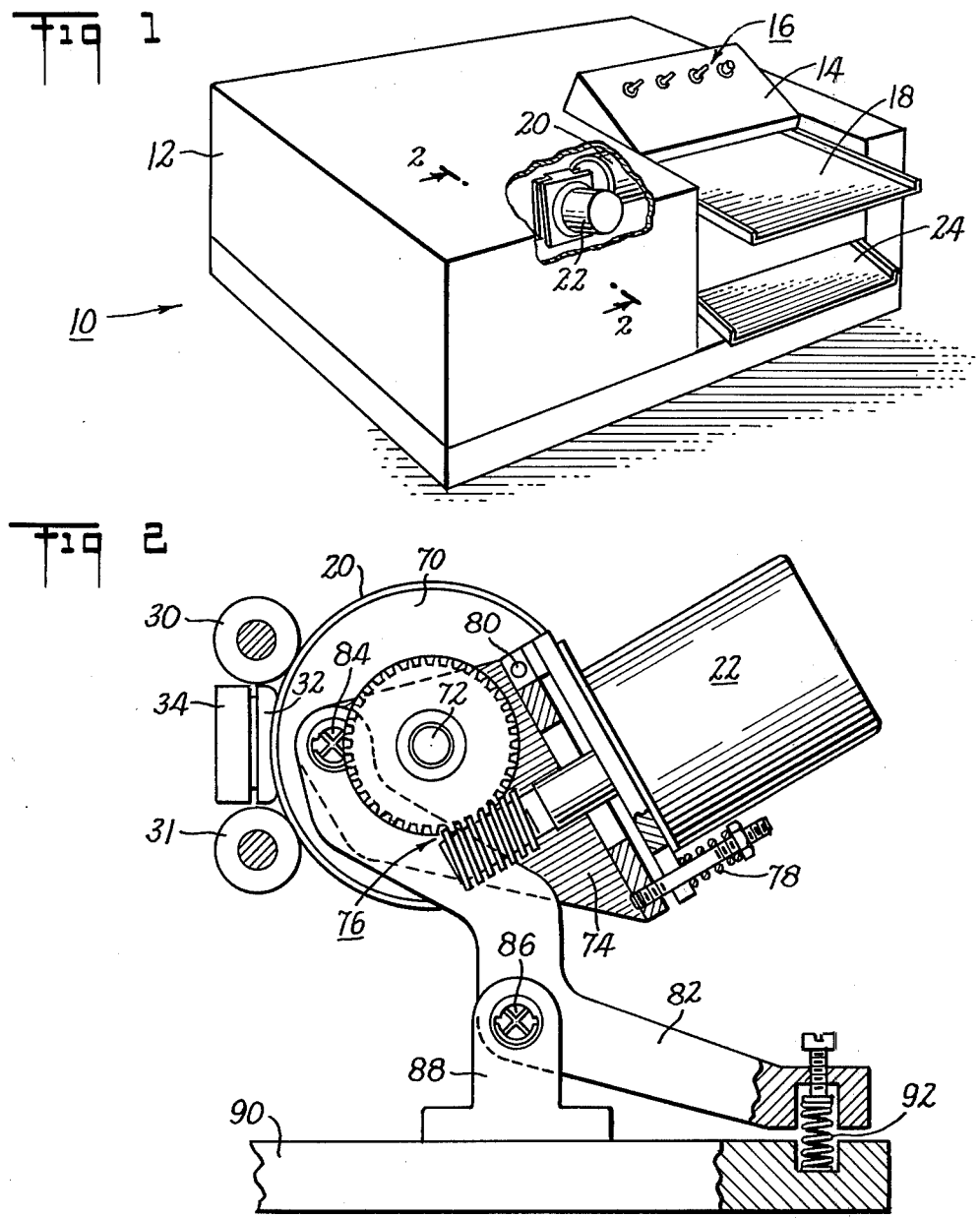

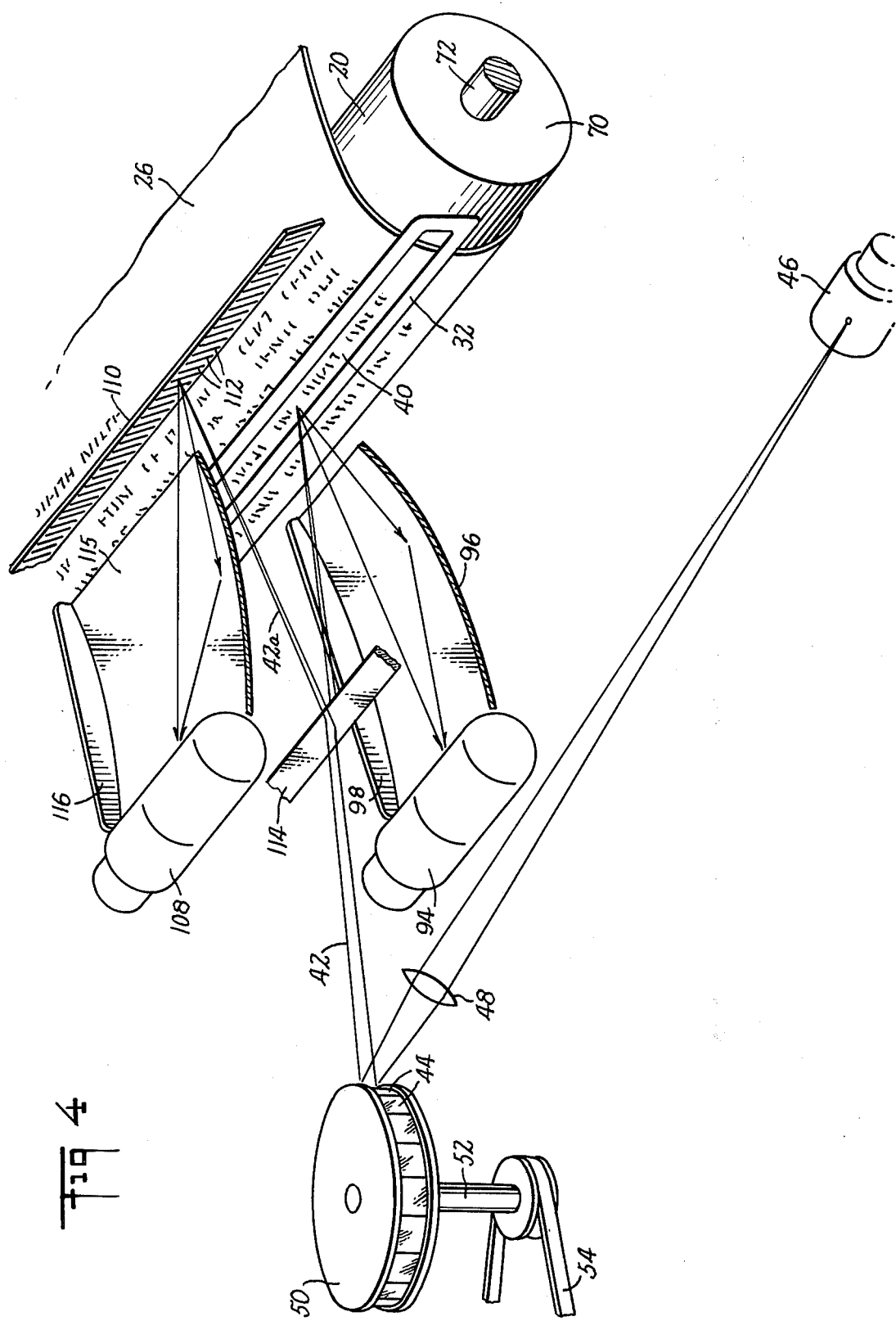

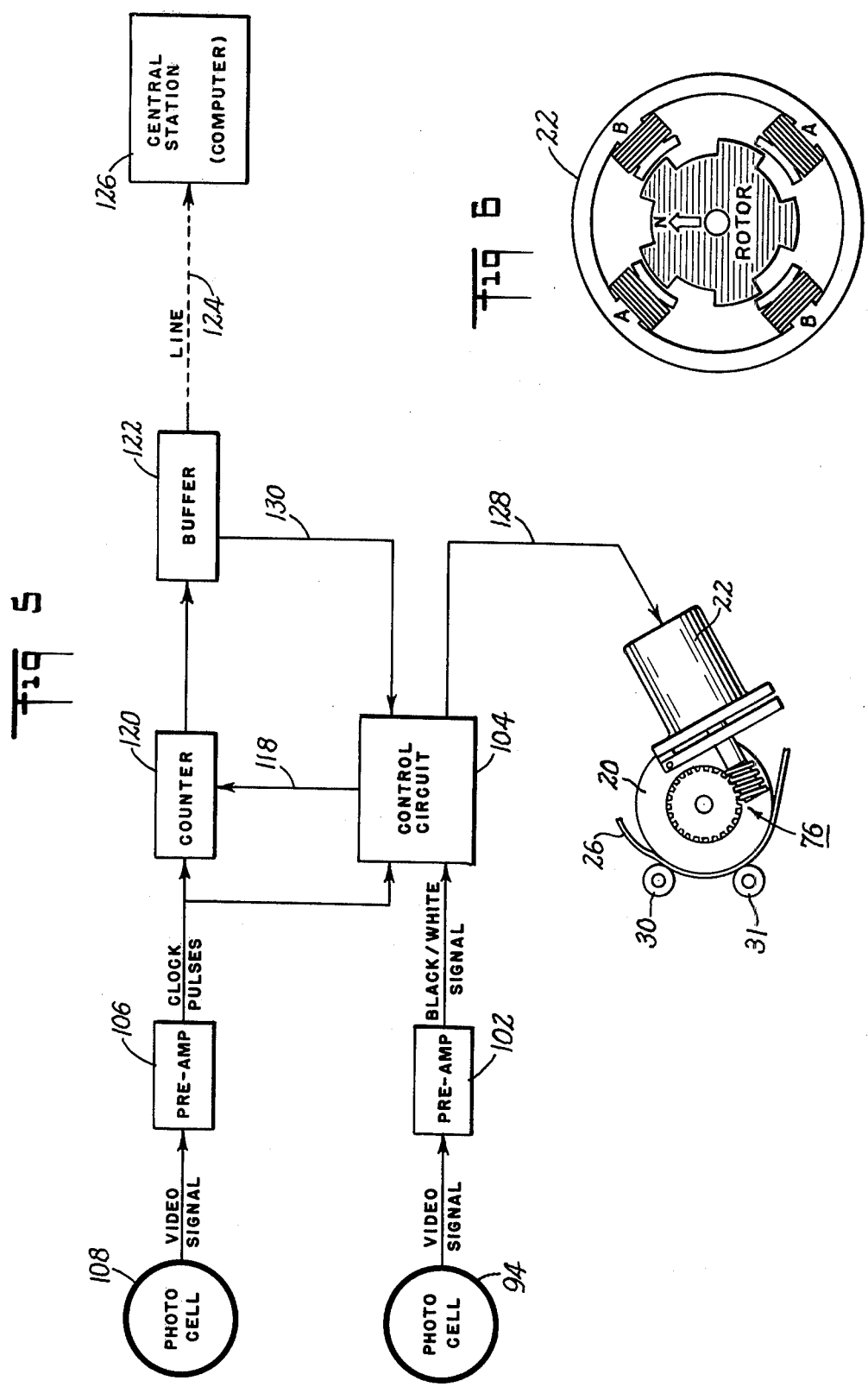

DATA HANDLING SYSTEM WITH REMOTE DOCUMENT SCANNER

This is a continuation of application Ser. No. 569,051 filed Apr. 17, 1975, now abandoned, which application is, in turn, a continuation of our copending application Ser. No. 66,149, filed Aug. 21, 1970 (now U.S. Pat. No. 3,893,079), which is a continuation of prior application Ser. No. 624,445, filed Mar. 20, 1967, and now abandoned.

This invention relates to graphic data handling systems. More particularly, this invention relates to such a system including a remote document scanner.

In an embodiment of the invention to be described hereinafter, there is provided a remote scanning unit of a size suited for installation on a desk-top. This unit includes an infeed guide channel into which the operator simply inserts the document to be scanned, and the scanner equipment thereupon automatically processes the document and returns it to the operator through an outfeed chute. The scanning time required for this processing depends to some extent upon the amount of graphic data on the document, but in any event the time is relatively short. For example, for certain types of commercial accounting forms, the total elapsed time between insertion and return of the document may be as short as a few seconds. During this time, the apparatus will have scanned the entire document in minute detail, appropriately coded the scanned data, and transmitted corresponding code signals to the central processor for interpretation and such further processing as might be required.

In the specific scanner disclosed herein, the infeed guide directs the document to be scanned into engagement with the outer surface of a rotatable drum of cylindrical shape. This drum is rotated rapidly in very short incremental indexing steps, carrying the document around with it. An optical scanning beam carrying light radiation traverses the drum lengthwise (i.e. in a direction parallel to the drum axis) in synchronism with the rotary stepping movement and in such a manner that the beam sweeps the drum while the latter is stopped during the "dwell period" between indexing steps. A photocell continuously measures the amount of light reflected from the scanned document, and directs a corresponding electrical signal to associated control circuitry. This reflected light signal is sampled periodically in time with clock pulses generated by a unique arrangement assuring that the samples always are taken at certain fixed positions of the scanning beam.

The control circuitry to which the sampled scan data is directed includes means to convert the sample signals to corresponding code signals suitable for transmission to the central station over a conventional narrow bandwidth channel, for example, a telephone line having a band-width of about 3,000 cps. When relatively large amounts of character data are encountered in any particular scan, the code signals may be produced at a rate too rapid to be sent to the central station over such a limited band-width transmission line. The code signals therefore are first placed in a buffer to await transmission.

At times, where the character data rate remains relatively high for a considerable time, the pre-transmission buffer will be filled and cannot accept any further data. The control circuitry is so arranged that under these circumstances the stepping of the drum is momentarily interrupted for a period of time sufficient to permit at least most of the buffered data to be transferred to the line. Thereafter, the data sampling and drum-stepping operations are resumed in such a manner as to assure that there is no loss of the basic character data.

This interruption of the drum stepping is of quite short duration, as a practical matter, and occurs only when the scan path contains a relatively large amount of graphic data, i.e. a large number of transitions between light and dark. At all other times, the stepping will proceed rapidly without pause. The overall average speed of advance for a document typically will be surprisingly high, for example, over one inch per second on some types of documents. Thus the apparatus is well suited for convenient and efficient operation to read a series of documents in rapid sequence.

It is a principal object of this invention to provide an improved graphic data handling system of the type having a remote scanning unit. Another object of this invention is to provide document scanning apparatus especially suited for remote operation to automatically process a document containing graphic data and to send corresponding data signals to a central data processor for analysis. A further and specific object of this invention is to provide an improved character reading system adapted to make efficient use of the transmission bandwidth available for sending the scanned data to the central station for interpretation. Other objects, aspects and advantages of this invention will in part be apparent from, and in part pointed out in, the following description considered together with the accompanying drawings, in which:

FIG. 1 is a perspective view of a scanner unit constructed in accordance with this invention, and partly broken away to show the document drum within the interior of the housing;

FIG. 2 is a cross-section taken along line 2—2 in FIG. 1, particularly showing the stepping motor arrangement for driving the drum;

FIG. 4 is a perspective view illustrating the development of the scanning beam and detection of the reflected light;

FIG. 5 is a schematic diagram showing the operating circuitry for handling the scanned data and controlling the stepping of the document drum; and FIG. 6 illustrates certain magnetic elements of the stepping motor.

Figure 3:
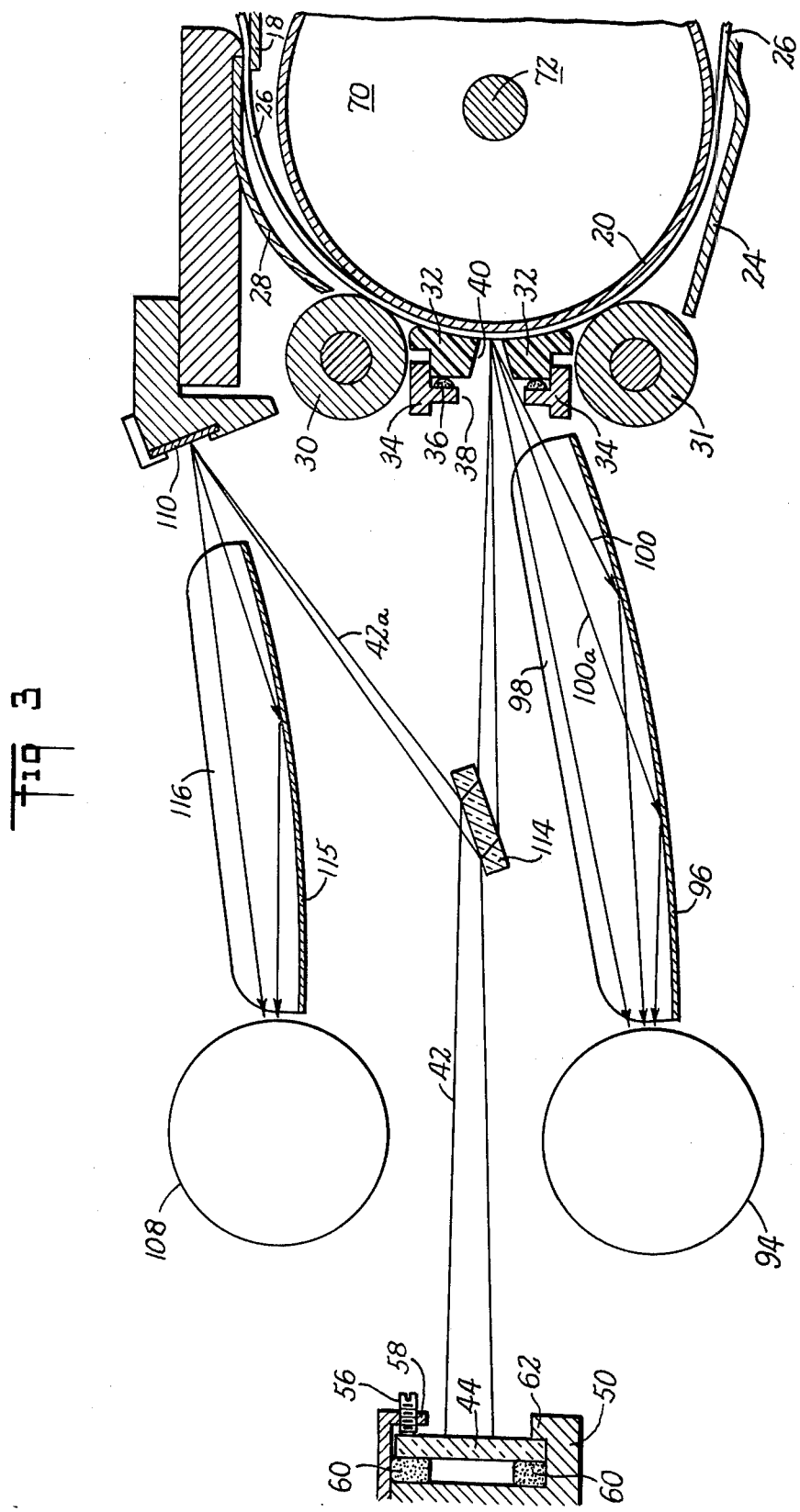
FIG. 3 is a cross-section showing the arrangement of the principal elements for casting the beam on the document.

Referring now to FIG. 1, there is shown in perspective an optical character scanner 10 comprising an outer housing 12 with a control panel 14 having manually-operable switches 16 for conditioning the equipment for various modes of operation. Below panel 14 is a document receptacle in the form of an open guide channel 18 leading with a slight downward incline into the interior of the scanner housing. The document to be scanned is inserted by the operator in this guide channel with the top edge of the document first, and the characters to be scanned facing upwards. The lines of characters on the document thus extend horizontally between the sides of the guide channel.

By sliding the document down the guide channel 18, the leading edge of the document is brought into engagement with the outer surface of a horizontal document drum 20 which is rotated about its axis by a drive motor 22 (see also FIG. 2). Drum 20 carries the document around with it for the scanning operation to be described. Beneath channel 18 is a return chute 24 from which the document exits after the scanning operation.

Referring now to the upper right-hand corner of FIG. 3, it will be seen that a document 26, upon being inserted into the scanner 10, will slide along the open channel 18 until it contacts a curved plate 28 spaced from the drum surface and generally aligned therewith. Plate 28 is shaped to deflect the document down into engagement with a small upper guide roller 30 rotatably mounted on a fixed axis parallel to the axis of the drum. As will be explained subsequently, the drum is spring-urged towards this guide roller 30 so that the document is gripped between the two and carried around with the drum into scanning position.

As the document 26 leaves the upper guide roller 30, it strikes a Teflon pressure pad 32 which is resiliently urged against the drum 20. The top surface of this pad is smoothly curved towards the drum so as to gently guide the leading edge of the document into contact with the drum. The longitudinally-extending top edge of the pressure pad also advantageously is inclined at a slight angle with respect to the drum axis, so that the document first strikes the pad at one corner of the paper, thereby minimizing any tendency to buckle. A second guide roller 31 is mounted beneath the pressure pad 32 to aid in holding the document 26 firmly in place on the drum 20, and also to direct the document to the chute 24 by which the document is returned to the operator.

The Teflon pressure pad 32 is held in place by a support 34 to which is secured foam rubber strips 36 pressing the pad firmly against the drum 20. Support 34 and pad 32 are formed with respective central longitudinal apertures 38 and 40 (see also FIG. 4) extending the full width of the widest document to be scanned, and exposing a transverse (side-to-side) sector of the document for scanning by an optical beam symbolically illustrated at 42.

As shown in FIG. 4, this optical beam 42 is reflected onto the document 26 by a mirror segment 44 illuminated by a light source 46. For certain applications, this source 46 may comprise a conventional commercially available incandescent element arranged to provide a small "point" of light, as by means of an electric arc of high intensity. However, in accordance with another aspect of this invention, source 46 is a laser providing a narrow beam of coherent light, for example, a gas laser producing a beam of 0.080 inch in diameter at a wavelength of 6328 Angstrom units. A lens 48 is provided to focus the beam on the document.

Use of such a laser arrangement is particularly advantageous because it provides a high light intensity which, in turn, produces a high signal-to-noise ratio, important in assuring high reliability of performance. Also, the nearly parallel rays of the laser beam simplify optical design specifications.

The mirror segment 44 is one of a number (sixteen in one embodiment) of identical separate plane segments arranged around the circumference of a horizontal disc 50 in a symmetrical configuration wherein all segments are disposed at equal angles with respect to their neighbors. Disc 50 is supported by a vertical shaft 52 rotated at a constant angular speed (e.g. about 937 RPM) by means of a flexible belt 54 driven from a synchronous type motor (not shown).

Rotary movement of the mirror causes the reflected beam 42 to sweep horizontally across the portion of document 26 which is behind the slot 40 in the pressure pad 32. Because disc 50 carries a number of mirror segments, it will be evident that a series of beams 42 will sweep in rapid succession across slot 40. The dimensions of the operative parts are such that one scan beam will have completed its sweep at one end of the slot 40 before the next beam starts its sweep at the other end of the slot.

The beam 42 follows an exactly horizontal path throughout its sweep. To this end, the "point" of the light source 46 is in the horizontal plane including the axis of the drum 20, and the mirror segments 44 all are perpendicular to this plane. In the present embodiment, this horizontal plane bisects the slot 40 through which the beam passes to the document being scanned.

It is particularly important to assure that successive sweeps produced by successive mirror segments 44 around the disc 50 follow precisely the same path. It is possible to accomplish this by careful design and manufacture of the mirrors an an integral unit.

Alternatively, the mirrors 44 can be individual elements provided with suitable adjustment means. For example, as shown in FIG. 3, the vertical tilt of each of the mirror segments is adjustable by a screw 56 through the upper flange 58 of the disc. This tilt is set at the time of assembly to provide a precise match of all of the scan paths.

To hold the mirrors 44 firmly but gently in place, and to accomodate the required slight movements of the mirrors during initial adjustment, there is provided behind each mirror segment resilient foam rubber padding 60 which urges the mirror out against the screw 56 at the top, and against the lower flange 62 of the disc at the bottom. When the screw is rotated, the mirror segment is correspondingly tilted about the lower flange 62, thereby to alter the vertical positioning of the scan beam 42 produced by that mirror segment.

As explained hereinabove, the drum 20 is stationary during the time the beam 42 is sweeping across the document 26. Between sweeps, the drum is rotated a small angular increment by stepping drive motor 22. The magnitude of this increment preferably is such as to cause the document to be shifted down a distance about equal to the diameter of the spot of light cast by the beam 42 on the document, e.g. a distance of about 0.005 inches to 0.010 inches. Thus with this interlaced sweeping and stepping, the beam progressively scans the characters on the document in a series of horizontal sweeps which are effectively contiguous.

In one embodiment of the invention, the time for one complete sweep-and-step cycle was 4 milliseconds, of which about 2 milliseconds were required for the beam to sweep across the document (during the "dwell" period of the drum), and the remaining 2 milliseconds were required for the drum to step to its next position for the succeeding sweep. With a cyclic period of 4 milliseconds, the frequency of movement is 250 steps per second, so that the surface speed of the document would be about 2.5 inches per second for steps of 0.010 inches. Of course, as will be evident from the description hereinbefore, the movement of the document will at times be interrupted, with a frequency dependent upon the complexity of the data being scanned, so that a speed of 2.5 inches per second cannot be maintained as an average speed during the complete processing of a document while transmitting over a narrow band-width channel. In any event, complete processing of documents can be accomplished in a relatively short time.

The drive motor 22 is a conventional device, for example of the type available commercially under the trademark "Slo-Syn", and as illustrated schematically in FIG. 6 has a permanent magnet rotor and two sets of field windings. The rotor has a plurality of teeth (five in the illustration) which is one more than the number of pole pieces for the fixed windings.

As is known, when direct current is applied to the field windings in one polarity, the rotor is locked into one magnetic "hold" position. By operating appropriate switch circuitry (not shown herein), the polarity of one field winding is reversed so that the magnetic field is rotated to cause the motor to step to a new "hold" position. By carrying out a series of such polarity changes, the magnetic field is made to rotate step-wise through a sequential series of orientations, thereby carrying the rotor through corresponding step positions.

The amount of movement of each step depends solely upon the geometry of the motor structure, including the rotor, and thus can be precisely uniform throughout the entire sequence of operations in scanning a document. No physical contact is required to transmit the stepping force since the force is produced by a magnetic field acting on the rotor. It will, accordingly, be evident that such a stepping drive motor provides important benefits in character reading where the intermittent stepping motion not only must be very rapid, but also the scan sweeps must be quite uniformly spaced to achieve reliably accurate recognition of the scanned characters.

To obtain the high-frequency stepping movement of the drum 20, the inertia load presented to the drive motor 22 preferably should be low. To this end, the drum comprises a thin-walled seamless tube (advantageously aluminum) supported by light-weight end caps 70 which, in turn, are secured to a small diameter stainless-steel shaft 72. The ends of this shaft are mounted for rotation in ball bearings carried by corresponding brackets 74, the left-hand one of which includes an enlarged portion to support the drive motor 22.

The rotor of the drive motor 22 is coupled to the drum shaft 72 by a worm gear arrangement 76 which provides a gear-reduction of about 7.5:1, and a corresponding reduction in the effective inertia load presented to the motor. To take up any slack in the drive gear, the motor is resiliently biased by a compression spring 78 so that it tends to rotate about a pivot hinge 80 secured to the support bracket.

The support brackets 74 are secured to respective arms 82 by cross-flexure pivots 84. These pivots, which are of a type available commercially, consist of two mutually-perpendicular spring strips, and provide a virtually frictionless pivot for small angular movements. A second set of such cross-flexure pivots 86 serves to secure the arms 82 to respective uprights 88 mounted on the equipment frame 90. An adjustable bias spring 92 is mounted at the rear end of each arm 82 to apply a moderate force tending to rotate the arms counter clockwise. This tension urges the drum 20 against the upper and lower guide rollers 30 and 31, and assures that the front surfaces of all documents scanned will be uniformly positioned regardless of the thickness of the document.

As the beam 42 sweeps across a document bearing characters, the amount of light reflected from the document will vary as the beam passes from the darkness of a character element to the relative lightness of the non-marked spaces between or within the characters. As shown in FIGS. 3 and 4, this reflected light is detected by a photocell 94 positioned below the plane of the beam 42. In order to maximize the amount of light received by the photocell, a curved shiny metal reflector 96 is provided beneath the light path, and vertical side reflectors 98 are positioned alongside. The curved reflector is contoured to provide a cross-section in the form of an ellipse and is so positioned that the surface of the document and the sensitive region of the photocell are located respectively at the two foci of the ellipse. This assures that light reflected from the document and striking the reflector will reach the photocell even though it travels over different paths, as indicated, for example, at 100 and 100a.

The photocell 94 produces in known manner an electrical signal corresponding to the amount of reflected light it receives, and referred to herein as a video signal. As shown in FIG. 5, this video signal is directed to a pre-amplifier 102 which includes conventional circuitry to produce a binary output (i.e. "high" or "low") depending upon whether the video signal is above or below a pre-determined threshold value. The so-called "high" output (acutally near electrical ground in the present embodiment) is produced when the reflected light corresponds to that from a character element (black), while a "low" output (more negative than a high output) is produced when the reflector light corresponds to that from an unmarked space (white).

The resulting binary black-white signal from pre-amplifier 102 is led to one input of a control circuit generally indicated by a block 104. The other input to the control circuit 104 carries clock pulses derived from a second pre-amplifier 106 activated by video signals developed by a second photocell 108. Details of one suitable control circuit for developing coded signals from the output signals of pre-amplifiers 104 and 106 can be found in U.S. Pat. No. 3,582,884.

Reverting to FIGS. 3 and 4, this second photocell 108 receives light reflected from an elongate horizontal strip 110 positioned above the pressure pad 32 and carrying a large number of narrow vertical markings 112 which are uniformly spaced along the strip. This strip is scanned by a beam of light 42a (referred to as the clock beam) reflected from the main beam by a half-silvered mirror 114 extending transversely across the path of the main beam. The remaining part of the main beam passes through the glass to the document 26 as described hereinbefore.

As the main beam 42 sweeps across the face of the document 26, the clock beam 42a correspondingly sweeps across the strip 110. Light reflected from the strip is directed to the photocell 108 by a curved reflector 115 and vertical reflectors 116, comparable to reflectors 96 and 98 previously described. The distinctive reflectivity of the markings 112 on the strip causes the video signal of the photocell 108 to consist of a series of regularly recurring pulses, and these pulses are converted by conventional threshold circuitry in the pre-amplifier 106 into sharp-edged clock pulses suitable for operation of timing circuitry.

Because of the common origin of the two beams 42 and 42a, the clock pulses developed by pre-amplifier 106 will always be positionally synchronized with the scanning of the document 26. That is, the clock pulses always will be produced when the main scanning beam is at certain fixed, uniformly-spaced positions along its sweep. This fixed relationship holds notwithstanding the fact that the constant angular velocity of the beam produces a beam spot velocity which is non-linear (higher near the edges than at the center).

This fixed relationship between the clock pulses and the beam position is important for accurate character recognition, particularly where rescan of a line is required, as explained below. It may also be noted that attainment of the desired relationship is not affected by the use of a multi-faceted disc 50, even though there may be slight variations in the angles between the mirror segments, because the clock beam always is positionally synchronized with the main beam.

The clock pulses are applied to an input of the control circuit 104 which serves to gate the signal input. That is, the black-white signals are "sampled" at regular clocked intervals to produce corresponding regularly-recurring binary pulses. These pulses indicate by their magnitude (logical one or logical zero) the effective presence or absence of character elements at the uniformly-spaced and fixed sample positions along the scan path.

These data pulses are fed to a shift register in the control circuit 104 (see for example shift register 120 in U.S. Pat. No. 3,582,884), and are there analyzed for various characteristics, particularly to determine the presence of transitions between "black" and "white". The results of this analysis are used to control (via line 118) the operation of a counter 120 which is activated by clock pulses. In effect, counter 120 produces a series of permutation code signals indicating the number of consecutive scan samples of the same character (white or black). These code signals are transferred, in groups of five-element pulses, to a buffer 122 from which they are directed to a transmission line 124 to be sent to the central station 126 having a data processing system organized to provide character analyzing.

At the end of each scan across document 26, the control circuit 104 generates and sends, via line 128, a current pulse to the drive motor 22 to cause that motor to rotate the drum 20 one incremental indexing step as described above. In one embodiment of this invention the equipment was arranged to produce 384 clock pulses during each complete scan across the document, these pulses being produced approximately every 5 microseconds. It is evident, of course, that the number of samples taken may be selected to suit particular applications. Generally speaking, the wider the document being scanned, the more samples should be taken. The last scan sample may, as described in the above-identified copending application, be artificially caused by the control circuit 104 to be a "black" bit so as to indicate to the central processing equipment that the scan is then complete.

At times, when the character data rate is relatively high (i.e. when the density of black/white transitions along the scan path is high) the buffer 122 will become filled bacause the transmission line 124 does not have the capacity to handle the code data at its maximum rate of generation. When the buffer is presented with a code group for which it has no room, an indicator signal automatically is sent via line 130 to the control circuit 104. The control circuit includes conventional logic circuitry which in response to this signal does the following: (1) stops the counting operation and holds the code previously developed by counter 120 until the buffer can accept it, (2) interrupts the stepping signal which normally would be sent via line 128 at the end of the scan, whereby the drum 20 remains in its position so as to permit a rescan of the same path by the beam 42 from the next mirror segment 44, and (3) counts 384 clock pulses occurring subsequent to the indicator signal on line 130. When this clock count reaches 384 (which occurs on rescan of the line at the same position where the "halt" originally took place), the counter 120 is activated in its "read" mode so as to continue the data sampling and coding operations as though there has been no interruption. During this one-scan halt, most of the data previously stored in the buffer 122 will have been sent out over the line 124. Thus, if the buffer is not again filled before the end of that rescan is reached, the usual stepping pulse will be sent to the motor 22 to index the drum 20 one step.

Although a preferred embodiment of the invention has been described in detail, it is desired to emphasize that this is for the purpose of illustrating the invention, it being recognized that various other embodiments can be produced within the scope of the invention as limited by the prior art.

We claim:

1. Data handling apparatus including means for scanning documents carrying graphic indicia; said apparatus comprising:

a first station having a document scanning unit including means to support a document in geometrical shape presenting contiguous, parallel straight-line elements passing through the graphic indicia;

said scanning unit also including a laser producing a beam of coherent radiation which is directed to said document to develop thereon a spot of light of small diameter;

scanning means including a rotatable mirror in the path of said beam for repetitively sweeping said laser beam along a scan path extending parallel to said straight-line elements;

means for advancing said document in synchronism with the operation of said scanning means so as to scan said graphic indicia with a series of successive adjacent scan paths parallel to each other and also parallel to said straight-line elements of said document;

said advancing means being constructed and arranged to provide said adjacent scan paths with center-to-center spacings at least approximately equal to said diameter of said spot of light;

sensing means to detect light reflected from the document as a result of the scanning thereof by said laser beam;

clock means coupled to the output of said detecting means for producing scan signals in the form of binary sample pulses each indicating the presence or absence of graphic indicia elements at corresponding regularly-spaced positions along each scan path with said positions being identical for successive scan sweeps;

a second station having receiving means for processing the graphic indicia information represented by said scan signals;

transmission means coupling said first station to said second station; and means at said first station responsive to said scan signals to develop and to direct to said transmission means corresponding signals suitable to be sent through said transmission means to said receiving means at said second station to transfer thereto the graphic indicia information representing said graphic indicia.

2. Data handling apparatus for scanning documents bearing graphic indicia at one station to produce scan signal data for transmission to a second station at a remote location, said apparatus comprising:

a document scanning unit having a rotatable document feed-drum with a cylindrical surface arranged to support a document in cylindrical shape while advancing the document;

said scanning unit including a laser producing a beam of coherent radiation which is projected towards said feed-drum to produce a small-diameter spot of light on a document carried by said feed-drum;

rotary scanning means positioned in the path of said laser beam and operable to repetitively sweep said laser beam along said feed-drum in a scan path running parallel to the axis thereof;

means for rotating said feed-drum in synchronism with said rotary scanning means so that said laser beam scans said document along successive evenly-spaced scan paths parallel to the drum axis and with adjacent scan paths having a center-to-center spacing at least approximately equal to the diameter of said spot of light;

sensing means to detect the laser radiation reflected from said document;

means coupled to the output of said sensing means for developing scan signals in the form of binary sample pulses indicating the presence or absence of graphic indicia elements at corresponding regularly-spaced positions along the scan path, with said positions being identical for successive scan sweeps along said feed-drum; and means responsive to said sample pulses to produce scan data signals suitable for transmission to said remote station.

3. Data handling apparatus for scanning documents bearing graphic indicia at a first station to produce scan data signals for transmission to a second station; said apparatus comprising:

a document scanning unit for said first station including means to support a document in a geometrical shape presenting contiguous parallel straight-line elements passing through the graphic indicia;

said scanning unit also including a laser producing a beam of coherent radiation which is directed to said document to develop thereon a spot of light of small diameter;

scanning means including a rotatable mirror in the path of said beam for repetitively sweeping said laser beam along a scan path extending parallel to said straight-line elements;

means for advancing said document in synchronism with the operation of said scanning means so as to scan said graphic indicia with a series of successive adjacent scan paths parallel to each other and also parallel to said straight-line elements of said document;

said advancing means being constructed and arranged to provide said adjacent scan paths with center-to-center spacings at least approximately equal to said diameter of said spot of light;

sensing means to detect light reflected from the document as a result of the scanning thereof by said laser beam;

clock means coupled to the output of said detecting means for producing scan signals in the form of binary sample pulses each indicating the presence or absence of graphic indicia elements at corresponding regularly-spaced positions along each scan path with said positions being identical for successive scan sweeps; and means responsive to said sample pulses to produce scan data signals suitable for transmission to said second station.

* * * * *